US 6,675,938 B2

(12) United States Patent
Yamamoto et al.

(10) Patent No.: US 6,675,938 B2
(45) Date of Patent: *Jan. 13, 2004

(54) DOOR SYSTEM INCLUDING LINEAR MOTOR DRIVING MECHANISM

(75) Inventors: Kouki Yamamoto, Hitachinaka (JP); Kim Houng Joong, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/274,897

(22) Filed: Oct. 22, 2002

(65) Prior Publication Data

US 2003/0037996 A1 Feb. 27, 2003

Related U.S. Application Data

(63) Continuation of application No. 09/793,752, filed on Feb. 27, 2001, now Pat. No. 6,467,584.

(30) Foreign Application Priority Data

Nov. 2, 2000 (JP) ........................................ 2000-340363

(51) Int. Cl.[7] ............................................. B66B 13/14
(52) U.S. Cl. ....................................... 187/316; 187/289
(58) Field of Search ................................. 187/316, 317, 187/289; 318/687, 155; 310/12; 49/118, 360

(56) References Cited

U.S. PATENT DOCUMENTS

| 3,872,622 A | 3/1975 | Berk ............................ 48/118 |
| 5,134,324 A | 7/1992 | Sakagami et al. ............. 310/12 |
| 5,172,518 A | 12/1992 | Yoshino ........................ 49/360 |
| 5,175,455 A | 12/1992 | Penicaut |
| 5,235,226 A | 8/1993 | Olsen et al. ................... 310/12 |
| 5,373,120 A | 12/1994 | Barrett et al. ................. 187/316 |
| 5,661,350 A | 8/1997 | Lucidarme et al. ............ 310/12 |
| 5,668,355 A | 9/1997 | Jaminet et al. ............... 187/316 |
| 5,736,693 A | 4/1998 | Piech et al. ................... 187/316 |
| 5,841,082 A | 11/1998 | Rivera et al. ................. 187/316 |
| 5,862,887 A | 1/1999 | Swaybill et al. .............. 187/316 |
| 5,896,951 A | 4/1999 | Reddy et al. ................. 187/316 |
| 5,949,036 A | 9/1999 | Kowalczyk et al. .......... 187/316 |
| 6,467,584 B2 * | 10/2002 | Yamamoto et al. ........... 187/316 |

FOREIGN PATENT DOCUMENTS

| EP | 0433830 | 6/1991 |
| JP | 8-275493 | 10/1996 |
| JP | 10-139325 | 5/1998 |
| WO | WO 00/69051 | 11/2000 |

OTHER PUBLICATIONS

U.S. patent application Ser. No. 09/959,615 filed on Nov. 1, 2001, as a national stage application under 35 USC 371 of international application No. PCT/JP00/02808 filed on Apr. 27, 2000.

* cited by examiner

Primary Examiner—Jonathan Salata
(74) Attorney, Agent, or Firm—Antonelli, Terry, Stout & Kraus, LLP

(57) ABSTRACT

A door system includes a door support by which a door is movably supported, a linear motor for generating a thrust to open and close the door, a link mechanism made of a non-magnetic material for transmitting the thrust generated by the linear motor to the door. The linear motor an armature, and a part having magnetism. The armature includes a first magnetic pole having a first polarity and a second magnetic pole having a second polarity. The first magnetic pole and the second magnetic pole collectively include a first opposed part which defines a first gap, and a second opposed part which defines a second gap. The part having magnetism is disposed in the first gap and the second gap. The door system may be used in the car of an elevator system.

13 Claims, 5 Drawing Sheets

DOOR SYSTEM INCLUDING LINEAR MOTOR DRIVING MECHANISM

CROSS-REFERENCE TO RELATED APPLICATION

This application is a continuation of application Ser. No. 09/793,752 filed on Feb. 27, 2001, now U.S. Pat. No. 6,467,584, the contents of which are hereby incorporated herein by reference in their entirety.

BACKGROUND OF THE INVENTION

The present invention relates to a door system, and more particularly to a door system suitable for use of a linear motor.

In a conventional door system, a door is driven by a rotary motor. Such a conventional door system, however, requires a mechanism for converting a rotary motion into a linear motion, a reduction gear and other components including a belt, which complicate the system structure and obstructs its reduction in size. For instance, there are disclosed door systems in JP-A-10-139325 and JP-A-8-275493, in each of which a linear motor is used in place of a rotary motor to drive the door. The linear motor may be either an induction motor or a magnet motor. The door systems, in which a linear motor incorporated in each door hanger generates a thrust in the opening/closing direction to directly drive the door, have no mechanism for converting a rotary motion into a linear motion nor reduction gears, which are found in any door system using a rotary motor. Thus, The door systems have reliable and compact configurations with few expendable components and parts needing lubrication.

However, the linear motors used in the already proposed door systems have some problems. The induction motor, whose structure essentially involves a wide magnetic air gap between the primary and secondary sides, has a problem that its output power is smaller than the input. The linear magnet motor, which comprises generally U-shaped cores to be electromagnets and permanent magnets, takes a long time and a much cost when manufacturing, because a coil must be wound around each core. Or a motor having permanent magnets opposed to magnetic pole faces with an air gap therebetween, also has a problem of a low output power relative to the input because of a large overall leak from a magnetic flux passing through gaps among magnetic pole teeth of magnetic pole plates.

BRIEF SUMMARY OF THE INVENTION

An object of the invention is to provide a door system which has a simple structure, is easy to manufacture and can obtain a high output power relative to the input.

According to one feature of the invention, a door system comprises a door hanger from which a door is movably suspended, an electric motor for generating a thrust to open and close the door, and a linear motor associating with a link mechanism made of a non-magnetic material for transmitting the thrust generated by the motor to the door. The linear motor comprises an armature to serve as a mover runner and a stator having magnetism, in which it is preferable for the armature to have at least a magnetic pole of a first polarity having a first opposed part and another magnetic pole of a second polarity having a second opposed part, and the stator is held in the second opposed part. It is further preferable for the linear motor, comprising the armature as a mover runner and the stator having magnetism, to be so constituted that relative positions of the mover runner in its moving direction and the vertical direction be held by mutual actions of the armature and the stator.

BRIEF DESCRIPTION OF PREFERRED EMBODIMENTS OF THE INVENTION

Preferred embodiments of the present invention will be described below with reference to FIGS. 1 to 6.

Figure 1:
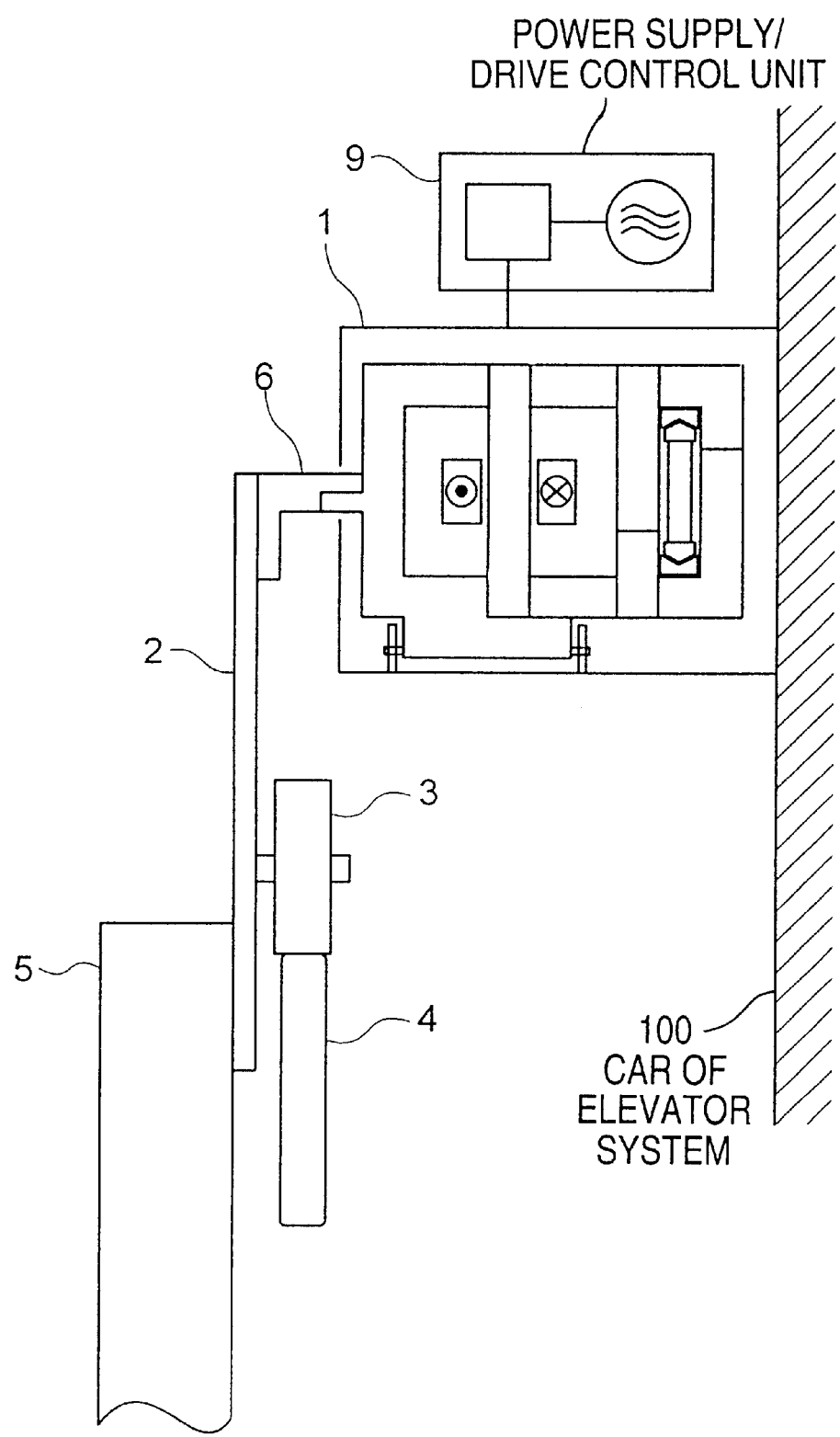
FIG. 1 is a longitudinal cross-sectional view of a configuration of a linear motor door system according to a preferred embodiment of the invention.
Figure 2:
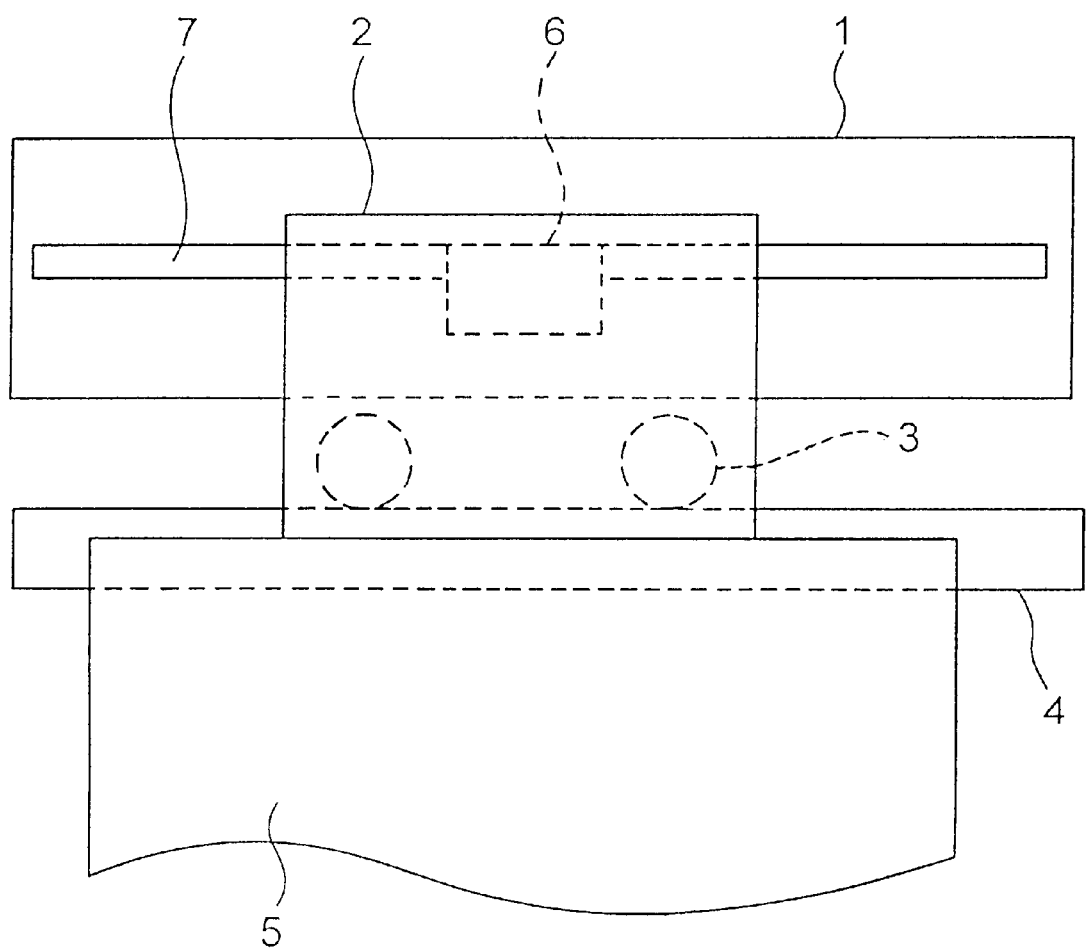
FIG. 2 is a schematic view of the configuration of the linear motor door system.

Referring to FIGS. 1 and 2, a door system, for opening and closing a door 5 suspended from a door hanger 2, comprises a detachably mounted linear motor unit 1, a link mechanism 6 made of a non-magnetic metal or resin for connecting a mover runner 590 (shown in FIG. 4) of a linear motor (shown in FIG. 3) in order to transmit the thrust of the linear motor to the door hanger 2, the linear motor being built in the linear motor unit 1; rollers 3 for holding a door unit movably along a guide rail 4, which are rotatably mounted on the door hanger 2; and a power supply/drive control unit 9 comprising an inverter for supplying power to the motor unit 1 and other components.

The guide rail 4 may associate with not only the rollers 3 but also a linear bearing (not shown).

The door system of the present invention is applicable to a car 100 of an elevator system.

Figure 4:
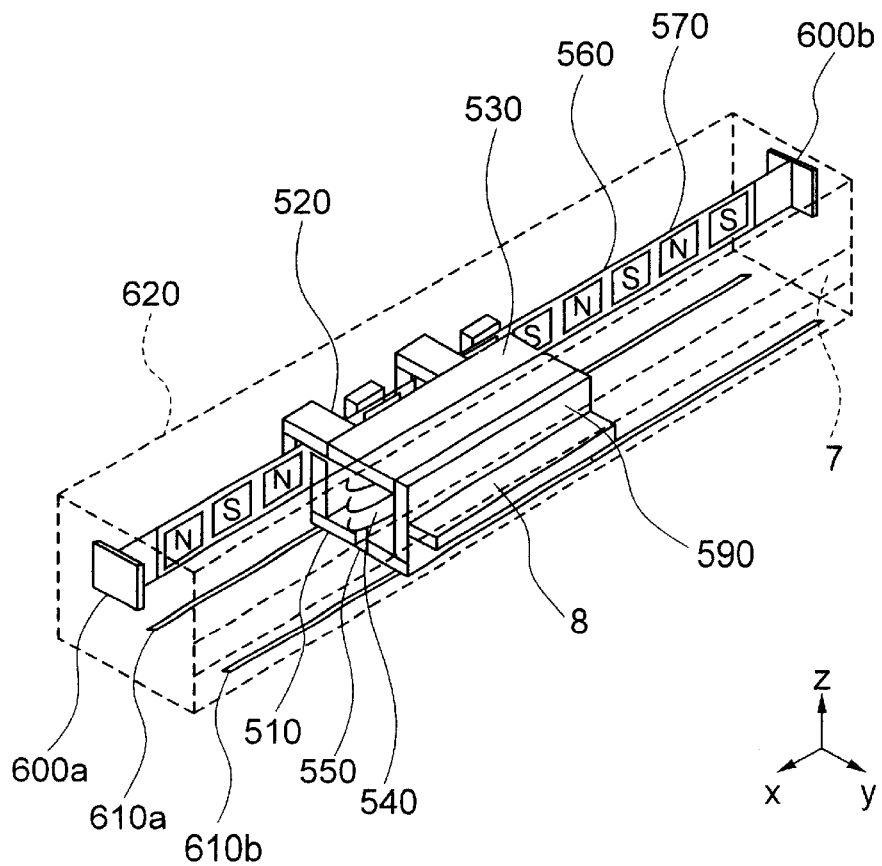
FIG. 4 is a perspective view of the configuration of the linear motor unit shown in FIG. 1.

Referring to FIGS. 2 and 4, the linear motor unit 1 comprises the linear motor shown in FIG. 4 and a case 620 which movably supports the mover runner 590 of the linear motor, securely supports a stator 560 shown in FIG. 4, and protects the linear motor from foreign matters in the ambient environment. The case is provided with an opening part 7 for connecting the link mechanism to the mover runner 590 in a sufficient longitudinal length to ensure a moving distance of the door. In this manner, the door 5 may be operated to open and close.

The linear motor which is the drive electric motor for opening and closing the door 5 is a linear synchronous one, which has a simple structure, is easier to manufacture than a conventional linear motor and can improve the output performance relative to the input because of a small leak of magnetic flux.

Figure 3:
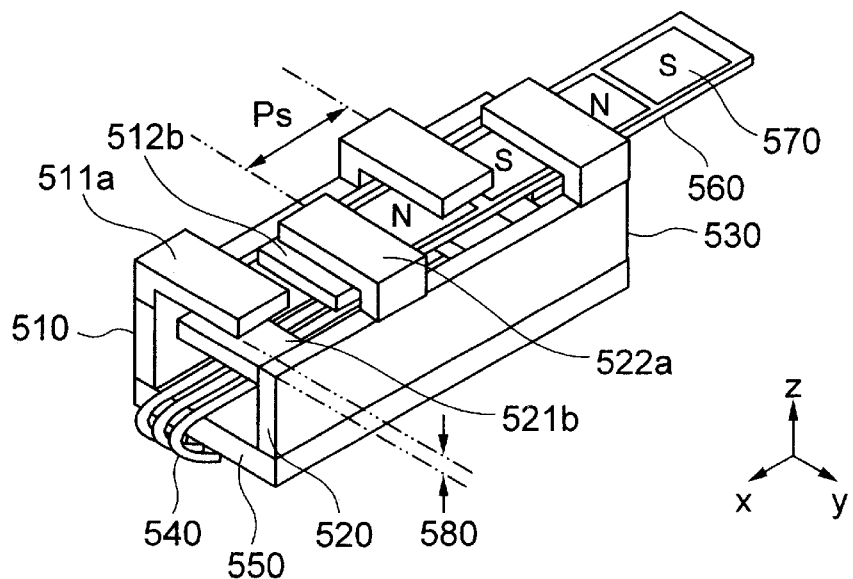
FIG. 3 is a perspective view of the configuration of the linear motor shown in FIG. 1.

Referring to FIG. 3 which shows the configuration of the linear motor for use in the linear motor door system, reference numeral 510 denotes a magnetic pole; 511*a* an upper magnetic pole tooth of a magnetic pole 510; 512*b* a lower magnetic pole tooth of the magnetic pole 510; 520 another magnetic pole; 521*b* a lower magnetic pole tooth of the magnetic pole 520; 522*a* an upper magnetic pole tooth of the magnetic pole 520; 530 an armature; 540 an armature coil; 550 an armature core; 560 a stator; 570 a permanent magnet; 580 a gap between the upper magnetic pole tooth 511a of the magnetic pole 510 and the lower magnetic pole tooth 521b of the magnetic pole 520 (or between the lower magnetic pole tooth 512b of the magnetic pole 510 and the upper magnetic pole tooth 522a of the magnetic pole 520); and Ps a pole pitch between adjacent magnetic pole teeth centers of the upper magnetic pole face. The armature 530 is so constructed that the magnetic poles 510, 520 are provided at the both sides of a bottom member, respectively, so as to form the elongated armature core 550 having a U-shaped cross section opening upwardly and a coil 540 is wound around the armature core 550 along the lengthwise direction. Thus the armature 530 has two magnetic poles 510 and 520.

Further, the magnetic pole 510 has the upper magnetic pole tooth 511a, the lower magnetic pole tooth 512b, . . . which project toward the magnetic pole 520. The magnetic pole 520 has the lower magnetic pole tooth 521b, the upper magnetic pole tooth 522a, . . . which project toward the magnetic pole 510. Thus, the projecting magnetic pole teeth of the magnetic pole 510 extend at alternate arrangements of upper and lower two levels such that the (2n−1)th (where n=1, 2, 3, . . . ) magnetic pole teeth are at the upper level and the (2n)th (where n=1, 2, 3, . . . ) magnetic pole teeth are at the lower level.

In contrast to the magnetic pole 510, the projecting magnetic pole teeth of the magnetic pole 520 extend at alternate arrangements of upper and lower two levels such that the (2n−1)th (where n=1, 2, 3, . . . ) magnetic pole teeth are at the lower level and the (2n)th (where n=1, 2, 3, . . . ) magnetic pole teeth are at the upper level. Here, the upper magnetic pole teeth of the magnetic poles 510 and 520, as a whole, are defined as an upper magnetic pole face and the lower magnetic pole teeth of the same, as a whole, are defined as a lower magnetic pole face. The structure is such that the magnetic pole teeth of the magnetic pole 510 and the magnetic pole 520, which oppose one another, can be said to have upper and lower two magnetic pole faces.

Herein, the first upper and lower magnetic pole teeth 511a, 521b are defined as a first opposed part, and the second lower and upper magnetic pole teeth 512b, 522a as a second opposed part. Consequently, the armature structure can be said that the (2n−1)th magnetic pole teeth is of the first opposed part and the (2n)th magnetic pole teeth is of the second opposed part.

Further, as the fixed gap 580 is provided between the upper and lower magnetic pole teeth of the respective opposed part and the stator having magnetism is arranged in the gap 580, there can be obtained a structure in which the stator is held at the first and second opposed parts.

According to the above arrangement, an armature unit is so constructed that a magnetic flux passes alternately upwards and downwards between the upper and lower magnetic pole teeth through the gap between the upper and lower magnetic pole teeth of the opposed parts of the linear motor, and that the armature 530 moves relatively through the gap as the mover runner.

Figure 5:
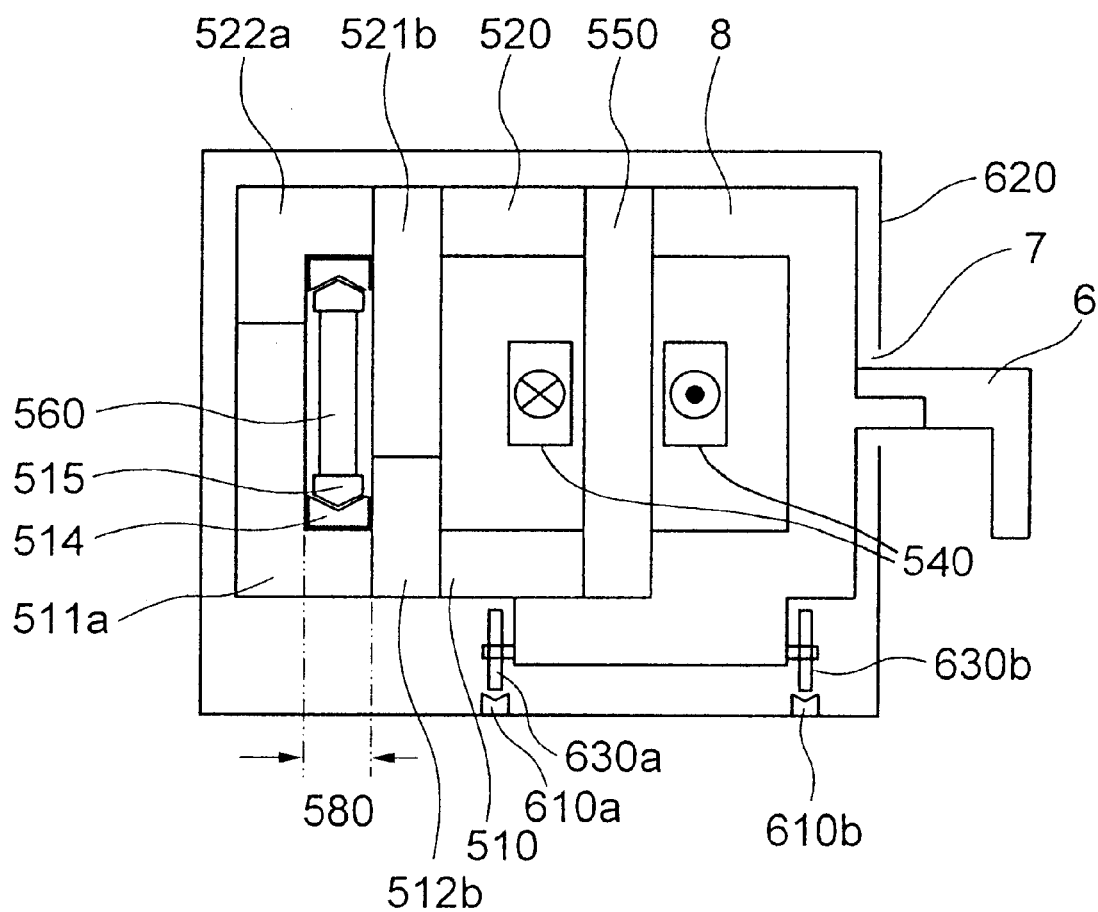
FIG. 5 is a longitudinal cross-sectional view of the linear motor unit shown in FIG. 4.

Referring to FIG. 4 which illustrates the linear motor unit 1, as a drive unit of the linear motor door system, shown in FIGS. 1 and 2, a case 620, which is made of a non-magnetic metal or resin and which is of a housing of the linear motor unit 1, covers the mover runner 590, the stator 560, stator attachment mechanisms 600a, 600b, mover runner guide rails 610a, 610b, and rollers 630a, 630b (see FIG. 5). The case 620 can prevent foreign matter from the ambient environment to enter the inner space of the drive unit and attach to the permanent magnet to adversely affect on the motor operation. The mover runner 590 is so constructed that a link base 8 made of a non-magnetic metal or resin is detachably attached to the armature 530. The mover runner 590 is supported by a mover runner supporting mechanism consisting of the mover runner guide rails 610a, 610b installed on the case 620 so as to have a sufficient length to ensure the running distance of the door 5 in the lengthwise direction and of the rollers 630a, 630b attached to the mover runner 590 so as to move in the lengthwise direction. The link mechanism 6 connected to the link base 8 is connected to the door hanger 2 through the opening part 7 of the case 620 which is formed such that the link mechanism 6 can move in the lengthwise direction of the case 620. The stator 560 is detachably fixed to the case 620 by the stator attachment mechanisms 600a, 600b at its both longitudinal ends.

Figure 6:
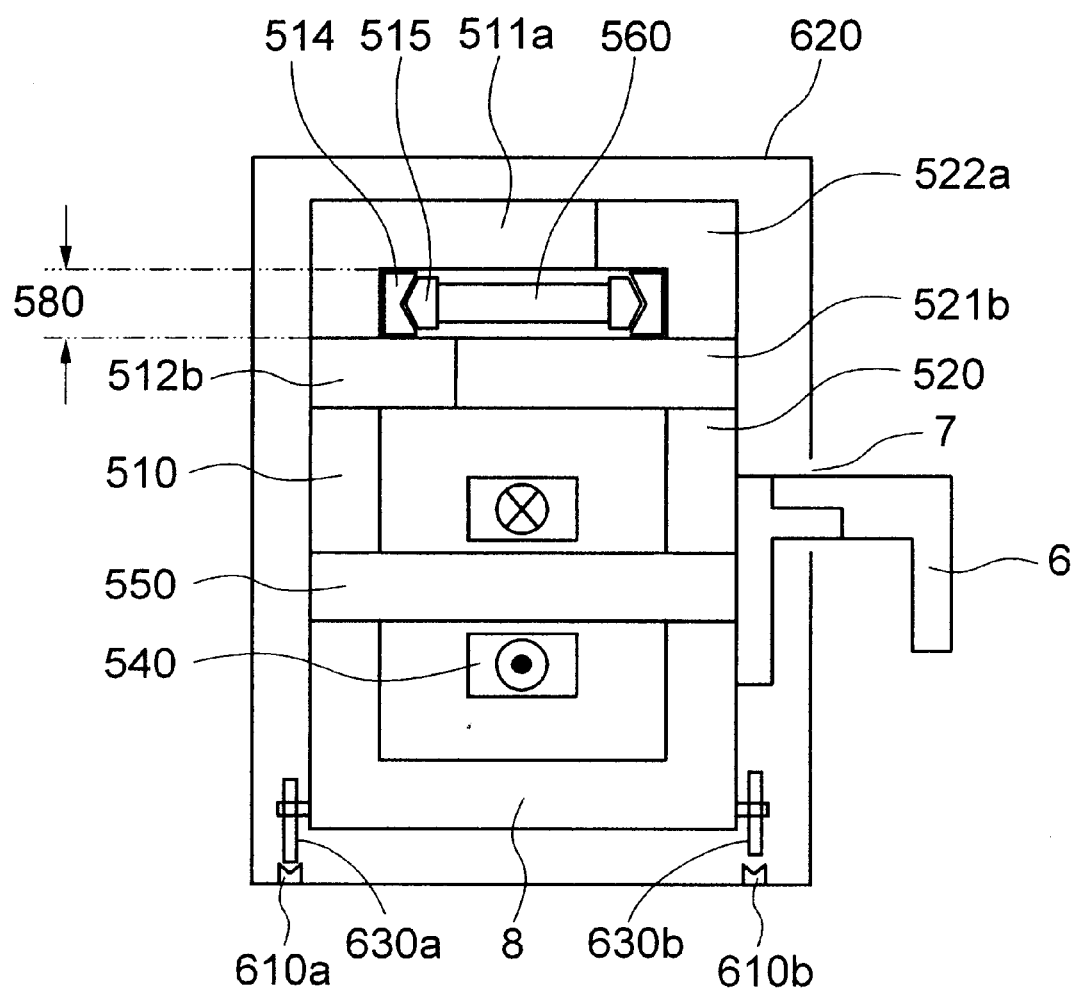
FIG. 6 is a longitudinal cross-sectional view of a linear motor unit according to another preferred embodiment of the invention.

FIG. 6 is an alternative of the linear motor unit 1 shown in FIGS. 4 and 5. In FIG. 6, the linear motor unit 1 is so constructed that the structure shown in FIG. 5 is turned clockwise by an angle of 90 degrees.

Although only one linear motor unit 1 is shown in FIG. 4, a multi-phase linear motor can be constructed by arranging a plurality of such units. Where a plurality of linear motor units 1 are to be arranged, they can be arranged either in series or in parallel.

The stator 560 is not limited to a permanent magnet, but may be a reluctance type linear motor, relying on variance of magnetic reluctance, in which a ferromagnetic body is provided with a structure of convexes and concaves.

Utilizing a stator which consists of a planar ferromagnetic body provided with convex magnetic pole teeth on both surfaces thereof, the magnetic reluctance between the stator and the magnetic poles at opposed parts of an armature varies in the advancing direction of the armature. In other words, the magnetic reluctance between the convex magnetic pole teeth of the stator and the magnetic poles at the opposed parts of the armature is smaller than that between the planar part of the ferromagnetic body and the magnetic poles at the opposed parts of the armature. By utilizing this difference in magnetic reluctance, a movable runner can be obtained. It is also possible to form a composite type stator to make the convex magnetic pole teeth with a ferromagnetic material and providing the planar part with a permanent magnet.

The linear motor used in the invention can be produced by preparing a core section, on which the armature coil is provided, and magnetic pole sections, which have the opposed parts to hold the stator with the permanent magnets, those being made from separate laminated steel plates, respectively, and by assembling them. The linear motor has a further feature that it can be readily attached to or detached from the door system.

According to the embodiments of the invention, it is possible to provide a door system which has a simple structure, is easy to manufacture, and can obtain a high output relative to the input because of less leak of a magnetic flux through gaps between the magnetic pole teeth of the magnetic pole plates. Although the invention has been described and disclosed with reference to some of the simplest embodiments thereof, it is apparent to those skilled in the art that various modifications of the invention are possible without deviating from the spirit and scope of the invention as claimed in the claims, and the invention can be applied to linear motor door systems in various fields. For instance, the invention is also applicable to an accordion door system. The preferred embodiments of the invention described above are such that an armature is arranged as the mover runner and a permanent magnet as the stator. However, it is also possible to arrange a permanent magnet as the mover runner and an armature as the stator.

The invention is also applicable to an elevator system having a car and a drive unit to drive the car, wherein the car has one of the door systems described above for its entrance/exit.

According to the invention, there is provided a door system which has a simple structure, is easy to manufacture, and can obtain a high output relative to the motor input.

What is claimed is:

1. A door system comprising:
   a door support by which a door is movably supported;
   a linear motor for generating a thrust to open and close the door; and
   a link mechanism made of a non-magnetic material for transmitting the thrust generated by the linear motor to the door;
   wherein the linear motor includes:
      an armature; and
      a part having magnetism;
      wherein the armature includes a first magnetic pole having a first polarity and a second magnetic pole having a second polarity;
      wherein the first magnetic pole and the second magnetic pole collectively include a first opposed part which defines a first gap, and a second opposed part which defines a second gap; and
      wherein the part having magnetism is disposed in the first gap and the second gap.

2. A door system according to claim 1, wherein the first magnetic pole includes first magnetic teeth and second magnetic teeth;
   wherein the second magnetic pole includes first magnetic teeth which respectively oppose the first magnetic teeth of the first magnetic pole across the first gap to constitute the first opposed part, and second magnetic teeth which respectively oppose the second magnetic teeth of the first magnetic pole across the second gap to constitute the second opposed part;
   wherein a magnetic flux passes through the first gap in a first direction; and
   wherein a magnetic flux passes through the second gap in a second direction opposite to the first direction.

3. A door system according to claim 1, wherein the linear motor is constituted such that relative positions of the armature in a moving direction and a vertical direction are held by mutual actions of the armature and the part having magnetism.

4. An elevator system comprising:
   a car;
   a drive unit for the car; and
   a door system according to claim 3 for the car.

5. A door system according to claim 1, wherein the part having magnetism extends over a sufficient length to accommodate a moving distance of the door; and
   wherein the armature, which is supported by an armature supporting mechanism so as to be movable in a lengthwise direction, is connected movably and detachably to the door via the link mechanism, thereby enabling the armature to move to open and close the door.

6. An elevator system comprising:
   a car;
   a drive unit for the car; and
   a door system according to claim 5 for the car.

7. A door system according to claim 1, wherein the linear motor is detachably installed in the door system.

8. An elevator system comprising:
   a car;
   a drive unit for the car; and
   a door system according to claim 7 for the car.

9. A door system according to claim 1, wherein the armature is covered by a case made of a non-magnetic material and having an opening part through which the armature can be connected to the door via the link mechanism and which can accommodate a moving distance of the door in a lengthwise direction;
   wherein the part having magnetism is fixed to the case at both of its longitudinal ends;
   wherein the armature is supported by an armature supporting mechanism; and
   wherein the linear motor and the case are integrated so as to constitute a detachable linear motor unit.

10. An elevator system comprising a car;
    a drive unit for the car; and
    a door system according to claim 9 for the car.

11. An elevator system comprising:
    a car;
    a drive unit for the car; and
    a door system according to claim 1 for the car.

12. An elevator system comprising:
    a car;
    a drive unit for the car; and
    a door system for the car;
    wherein the door system includes:
       a door support by which a door is movably supported;
       a linear motor for generating a thrust to open and close the door; and
       a link mechanism made of a non-magnetic material for transmitting the thrust generated by the linear motor to the door;
       wherein the linear motor includes:
          an armature; and
          a part having magnetism magnetically coupled to the armature;
          wherein the armature includes a first magnetic pole having a first polarity and a second magnetic pole having a second polarity; and
          wherein the first magnetic pole and the second magnetic pole collectively include a first opposed part which defines a first gap, and a second opposed part which defines a second gap.

13. An elevator system according to claim 12, wherein the first magnetic pole includes first magnetic teeth and second magnetic teeth;
    wherein the second magnetic pole includes first magnetic teeth which respectively oppose the first magnetic teeth of the first magnetic pole across the first gap to constitute the first opposed part, and second magnetic teeth which respectively oppose the second magnetic teeth of the first magnetic pole across the second gap to constitute the second opposed part;
    wherein a magnetic flux passes through the first gap in a first direction; and
    wherein a magnetic flux passes through the second gap in a second direction opposite to the first direction.

* * * * *